(No Model.)
W. B. WALTERS.
PNEUMATIC CHURN.
No. 460,384. Patented Sept. 29, 1891.
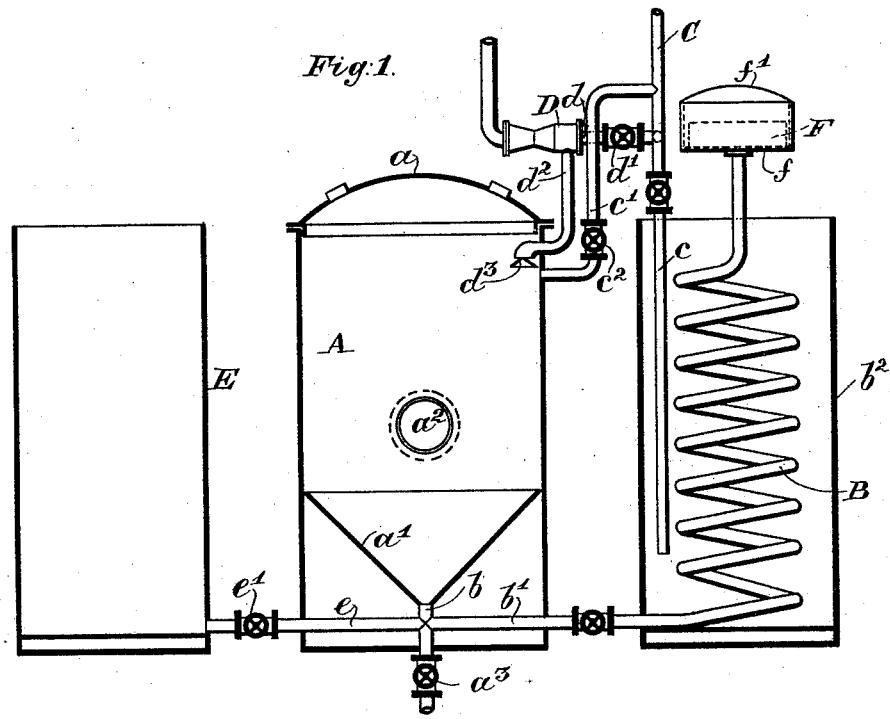
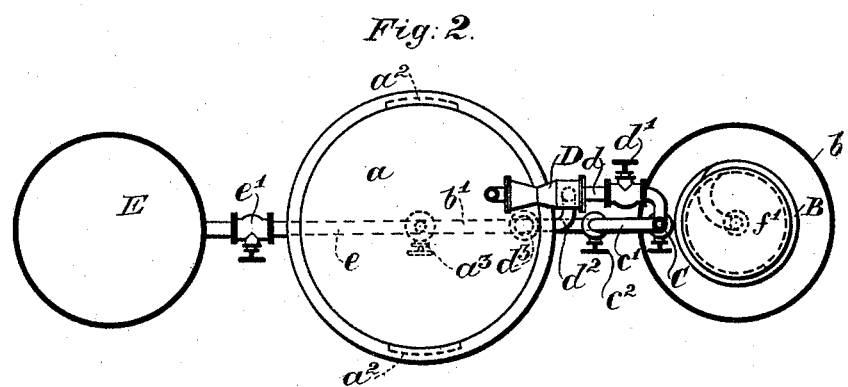
WITNESSES.
John Henry Horking
Colin Dale Arlidge
INVENTOR:
William Benjamin Walters
By Richards
his Attorneys.

United States Patent Office.

WILLIAM BENJAMIN WALTERS, OF DUNEDIN, NEW ZEALAND, ASSIGNOR OF ONE-HALF TO WILLIAM BROWN, OF SAME PLACE.

PNEUMATIC CHURN.

SPECIFICATION forming part of Letters Patent No. 460,384, dated September 29, 1891.

Application filed February 27, 1891. Serial No. 383,022. (No model.)

*To all whom it may concern:*

Be it known that I, WILLIAM BENJAMIN WALTERS, a subject of the Queen of Great Britain, residing at Dunedin, in the British Colony of New Zealand, have invented new and useful Improvements in Pneumatic Churns, of which the following is a specification.

This invention relates to what are known as "pneumatic churns"—that is, to the class of apparatus which is employed for manufacturing butter by passing air through milk or cream contained in a suitable vessel. Its object is to simplify the working of these machines and to obviate the necessity for the continuous employment of manual labor in order to cause the air to pass through said cream.

It consists in a pneumatic churn constructed as hereinafter described, reference being had to the accompanying drawings, wherein—

Figure 1 is a sectional view of a complete pneumatic churn embodying this invention, while Fig. 2 is a plan of said apparatus.

Similar letters of reference indicate the same parts in both figures.

A represents a chamber or vessel made of wood, earthenware, or other material adapted to contain a supply of the milk or cream from which it is desired to manufacture butter. This chamber or vessel A is provided with a steam-tight lid or cover $a$, and it may be formed with a conical bottom $a'$, into which is fitted a short piece of connecting-pipe $b$, which communicates through another length $b'$ with a coiled pipe B, contained within a vessel $b^2$, which can be filled with water or other liquid when it is desired to either heat or cool the air passing into the vessel A, as hereinafter described. The liquid contained in this vessel $b^2$ may be heated, if required, by passing steam through it from a steam-delivery pipe $c$, extending down from the main steam-supply pipe C, or it might, if required, be cooled by any convenient means in the event of it being found advisable to pass cool air through the milk or cream.

D represents a steam-ejector, which is connected by a pipe $d$, fitted with a valve or stop-cock $d'$, with the steam-pipe C, and which also communicates with the interior of the chamber or vessel A by a short length of pipe $d^2$. A baffle-plate $d^3$ is preferably arranged beneath the lower end of the pipe $d^2$, in order to prevent any particles of milk or cream being drawn up said pipe into the ejector D, while a pipe $c'$, connected with the steam-pipe C, passes through the side of the vessel A, in order that steam may be fed into said vessel when it is required to cleanse or scald same, said pipe $c'$ being fitted with a stop cock or valve $c^2$, whereby the flow of steam into said vessel can be turned on or off at will. Connected with the inlet-pipe $b$, leading into the vessel or chamber A, is a cistern or reservoir E, which can be filled with water or brine in order that the butter in the chamber or vessel A may be washed or salted as required, said pipe $e$ being provided with a stop cock or valve $e'$, in order that the flow of said water or brine into said vessel or chamber may be either turned on or off or regulated at will. Sight-glasses $a^2$ may be fitted in the sides of the vessel A to enable the operations to be watched.

In order to purify the air passing into this improved pneumatic churn, the upper end of the coiled pipe B may be connected to the bottom of a small box or holder $f$, containing a block or pieces F of carbon and fitted with a perforated or other lid $f'$, said carbon being fitted into said holder $f'$ in such a manner as to cause the air to pass through said carbon before being used in the churn. By these means a supply of pure air can be insured.

The operation of this invention is as follows: The cream or milk to be churned is placed in the chamber or vessel A and the cover $a$ is fitted tightly thereon. The valve $d'$ is then opened, so as to cause steam to pass from the pipe C through the ejector D, the effect of which is to withdraw air from the chamber A and so tend to produce a vacuum therein. The valve or stop-cock in the pipe $b'$ being opened, air will be drawn through the carbon F (if used) through the coiled pipe B and into the lower end of the vessel A, where it will be passed through the body of the cream or milk contained therein and will agitate it, so as to cause the separation of the globules which form the butter, said air afterward being withdrawn in its turn from said vessel by means of the ejector D, and thus giving place to a fresh supply, which enters, as before, through the coiled pipe B, and thus continues the operation. After the butter has "come" the discharge-valve $a^3$ at the bottom of the vessel A is opened, so as to draw off the milk therefrom, the cock or valve $d'$ and the stop-cock or valve in the pipe $b'$ having been closed prior to this being effected. This said draw-off or waste cock $a^3$ is then again closed and the cock or valve $e'$ opened to allow a supply of water from the vessel E to pass into the chamber A, in order to wash the butter contained therein and so completely separate the whole of the buttermilk therefrom, after which said vessel E can be charged with brine, which may then be drawn into the chamber A, in order to salt the butter therein contained. When this has been satisfactorily accomplished, the brine is run off through the waste-cock $a^3$ and the butter is removed from the machine and worked up in the ordinary manner. If found desirable, the stop-cock $c^2$ can be opened to admit a supply of steam into the vessel A, for the purpose of scalding and purifying same.

Having now particularly described and ascertained the nature of my said invention and the manner of performing same, I declare that what I claim is—

1. An apparatus for churning, comprising a suitable milk-containing receptacle, an air-supply pipe connected with the lower part of said receptacle, a source of steam-supply, and a steam-ejector in communication with the top of the milk-containing receptacle, substantially as described.

2. An apparatus for churning milk, comprising a suitable receptacle, an air-supply pipe in connection with the lower part of said receptacle, a steam-supply pipe in connection with the upper portion of said receptacle, an ejector located at a suitable point on said steam-supply pipe, and a vessel, as E, also in communication with the lower side of the milk-containing receptacle, substantially as described.

3. A churn comprising a suitable milk-containing receptacle having a draw-off cock at its lower end, a pipe supplying air to the lower part of said milk-containing receptacle, means for filtering the air, a steam-supply pipe, an ejector located in said pipe, a pipe $d^2$, leading from said steam-pipe to the top of the milk-receptacle, the ejector being located at the point where said pipe joins onto the steam-pipe, a second pipe, as $C'$, for supplying steam to the receptacle, and a chamber or vessel, as E, also in connection with the lower end of said receptacle.

WILLIAM BENJAMIN WALTERS.

Witnesses:
JOHN HENRY HOSKING,
*Solicitor, Dunedin, New Zealand.*
COLIN DALE ARLIDGE,
*Clerk to Messrs. Kenyon & Hosking, Solicitors, Dunedin, New Zealand.*